United States Patent [19]

Endo

[11] Patent Number: 4,769,719

[45] Date of Patent: Sep. 6, 1988

[54] FACSIMILE SYSTEM

[75] Inventor: Etsuro Endo, Tokyo, Japan

[73] Assignee: NEC Corporation, Japan

[21] Appl. No.: 777,933

[22] Filed: Sep. 19, 1985

[30] Foreign Application Priority Data

Dec. 19, 1984 [JP] Japan ............................ 59-267827

[51] Int. Cl.[4] .............................................. H04N 1/32
[52] U.S. Cl. ..................................... 358/296; 358/257
[58] Field of Search ............... 358/296, 287, 288, 256, 358/257, 258, 294, 280, 260, 85

[56] References Cited

U.S. PATENT DOCUMENTS

| | | | |
|---|---|---|---|
| 3,502,817 | 3/1970 | Salaman et al. ................ | 358/296 X |
| 4,113,993 | 9/1978 | Heckman et al. ............... | 358/280 X |
| 4,516,156 | 5/1985 | Fabris et al. ..................... | 358/85 X |
| 4,573,084 | 2/1986 | Iida ................................... | 358/296 X |

FOREIGN PATENT DOCUMENTS

59-226554 12/1984 Japan ................................... 358/296

*Primary Examiner*—Clifford C. Shaw
*Attorney, Agent, or Firm*—Laff, Whitesel, Conte & Saret

[57] ABSTRACT

A facsimile system has an operation controller for generating overhead information including a called party address, a demand for confirmation of recording, instructing for the transmission of a document. The document is scanned to produce binary picture data. A storage memory records the overhead information and encodes the picture data. The designated receiving party is called and the stored data is read out of the memory and transmitted, along with a demand for confirmation of the recording of the received information. As the transmitting side demands a recording confirmation response, it designates an address to which the response to the demand should be sent, which is done upon the completion of the recording of the picture signals. The facsimile machine at the initial transmitting party's station records in its recording means the contents of the response to the demand for confirmation of recording.

10 Claims, 5 Drawing Sheets

FACSIMILE SYSTEM

BACKGROUND OF THE INVENTION

The present invention relates to a facsimile system, and more particularly to a facsimile system having a function to temporarily store video information of a document.

Generally in a facsimile system for real time communication, the reading of a document on the transmitting side is immediately followed by the reproduction on the receiving side and the completion of the reproduction is adequately done by confirming the completion of transmission.

However, as facsimile communication has grown in speed and the development of a high speed communication network has made progress, resulting in a more entensive use of facsimile systems, it is becoming an increasingly common practice, instead of performing facsimile communication on a real time basis, to equip facsimile systems with large capacity memories, so that the documents to be transmitted are read at high speed irrespective of the line conditions, the video information so read is temporarily stored, supplemented with the addressee information, and the stored information is transmitted to one addressee at a time when the line is vacated.

By this method, in spite of its advantage to reduce the time constraint on the system operator and to improve his efficiency, it is impossible to schedule in advance the execution of reading, transmission, reception and recording of the document. Accordingly, the prior facsimile system which temporarily stores video information has the disadvantage that it is impossible for the transmitting side to confirm whether or not the receiving side has recorded the video information transmitted.

SUMMARY OF THE INVENTION

An object of the present invention, therefore, is to provide a facsimile system equipped with a memory unit to store video information read from the document to enable the transmitting side to confirm whether or not the facsimile system on the receiving side has completed the recording of the video information transmitted.

According to the invention, there is provided a facsimile system comprising: operation controller means for generating overhead information including an addressee and a demand for a recording confirmation response and for instructing the transmission of a document; scanner means for scanning the document and producing binary picture data; CODEC means for encoding said picture data and for decoding received picture data; storage memory means for memorizing said overhead information and encoded data; printer means for printing out the decoded picture data; communication controller means for calling a designated receiving party upon disengagement of a line, transmitting various information stored in said storage memory means after the connection of the line, and receiving recording confirmation response information which the receiving party transmits after completion of the reproduction of the document in response to recording confirmation response demand information sent from the transmitting party; a main controller means for accomplishing scanning control of said scanner means, write-in and read-out control of said storage memory, communication control of said communication controller means, and printing control of said printer means; and control means responsive to said recording confirmation response information for instructing said printer to print out characters indicating the completion of the reproduction of the document at the receiving party.

Further according to the invention, as the transmitting side demands a recording confirmation response, designates an addressee and the demand and designation are transmitted to the addressee as overhead information, the addressee prepares reply information in response to the demand for a recording confirmation response upon completion of the recording of picture signals and transmits the response information back to the initial transmitting party upon disengagement of a communication line. The initial transmitting party records the contents of the response information in characters in its recording means.

BRIEF DESCRIPTION OF THE DRAWINGS

The present invention will be better understood from the following detailed description taken in conjunction with the accompanying drawings, in which.

DETAILED DESCRIPTION OF THE PREFERRED EMBODIMENT

Figure 1:
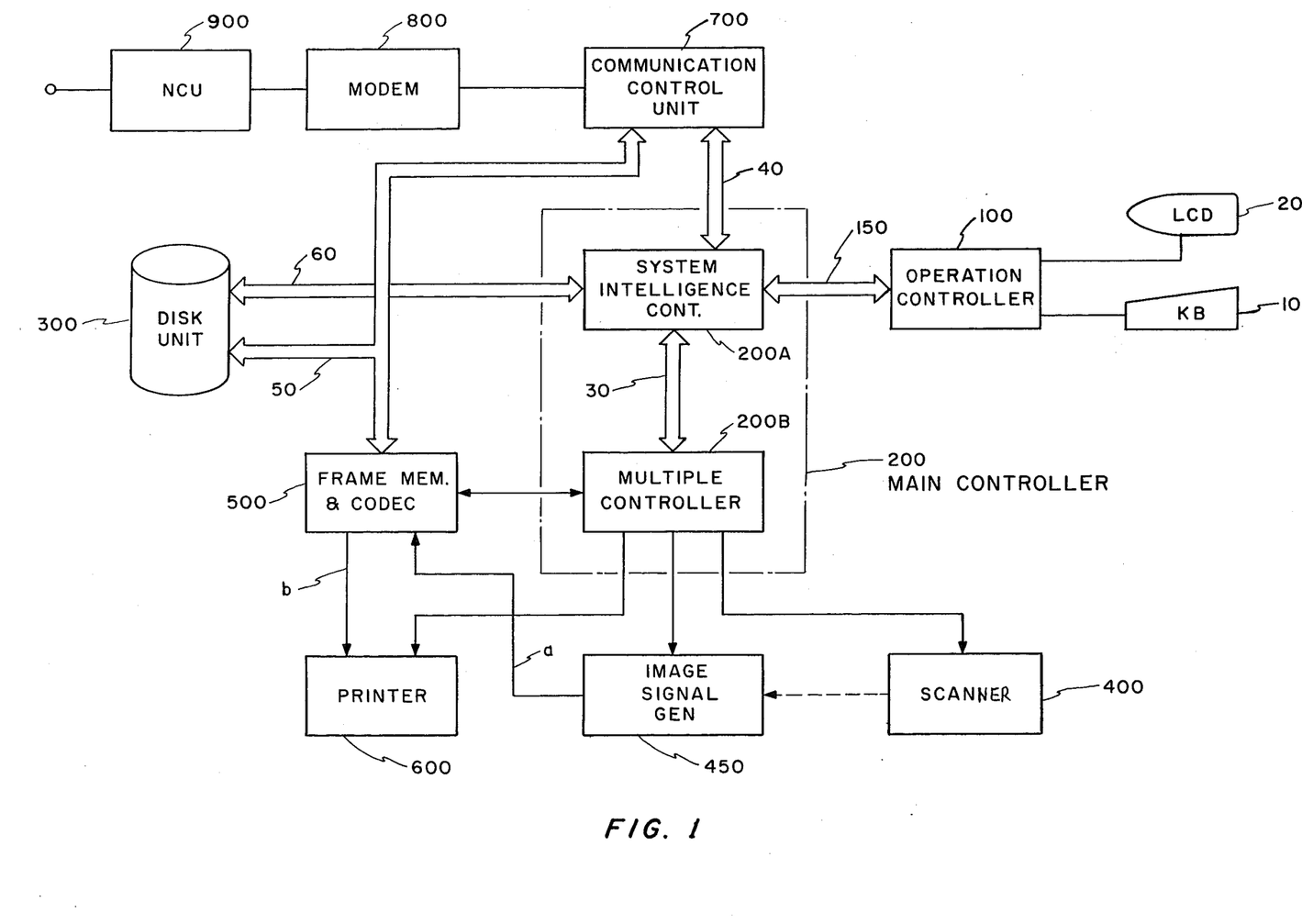
FIG. 1 is a block diagram illustrating a preferred embodiment of the invention.

In FIG. 1, a keyboard 10 allows inputting addressee information, consisting of the telephone number of the addressee, and recording confirmation response (or reply) demand information for confirming the completion of recording on the receiving side. A liquid crystal display (LCD) 20 displays the contents of information entered from the keyboard 10 in letters and numerals.

An operation control unit (OPC) 100 prepares overhead information on the basis of the transmitting party's telephone number memorized in advance together with the addressee information and record confirmation response demand information, and generates information to instruct the start of document reading. The overhead information consists of information transfer codes of the addressee's and transmitting party's telephone numbers, both in ASCII codes, and a code representing the presence or absence of a recording confirmation response demand.

A main controller 200 comprises a system intelligence controller (SIC) 200A and a multiple controller (MIC) 200B, which are coupled to each other by way of a bus 30. The system intelligence controller 200A enters from the operation control unit 100 document reading instruction information and the overhead information through a bus 150. In response to the reading instruction information, the system intelligence controller 200A provides a document scanning instruction for the multiple controller 200B, and further controls the writing and reading of various information, including the overhead information and encoded data, into or out of a disk unit 300' and, through a bus 40, a communication control unit (CCU) 700.

The multiple controller 200B controls a document scanner unit 400, an image signal generator circuit 450, a frame memory and CODEC 500 and a printer 600. The document scanner unit 400 scans the document with a laser beam from a laser source. The image signal generator 450 incorporating a CCD image sensor receives the light reflected from the surface of the document to convert an electrical signal, and binarizes the electrical signal to generate a black or white binary image signal a.

The frame memory and CODEC 500 includes a frame memory for storing the image data a supplied by the image signal generator circuit 450, encodes the data a and sends them out to a bus 50. It further receives encoded data from the bus 50, and decodes and supplies them to the printer 600 as a black or white binary image data b.

The printer 600 reproduces on recording paper the image of document in accordance with signal b read out of the frame memory and CODEC 500. This printer is also capable of printing out in letters and numerals recording confirmation reply information sent from the receiving side.

The communication control unit 700 makes a call to a prescribed addressee under the control of the system intelligence controller 200A, and transfers data to be transmitted to a modulator-demodulator (MODEM) 800. It also receives transmitted data, and sends them to the bus 40 or 50. The form and transmission procedure formulated by this communication control unit 700 conforms to the protocol of packet communication under the CCITT Recommendation X 25.

The MODEM 800 modulates data to be transmitted or demodulates transmitted data from the line according to the transmission speed. A network control circuit (NCU) 900 connects and restores the line.

Suppose now that, by the use of the facsimile system illustrated in FIG. 1, data in a document 1 are transmitted to another facsimile system of the addressee A, and data of documents m and n to still another facsimile system of addressee B. In this case, first the document 1 is set and scanned in the document scanner unit 400, and the encoded data, together with overhead information, are written into the disk unit 300'. Then, the documents m and n to be transmitted to the addressee B is set in the document scanner unit 400, and its encoded data, together with overhead information, are similarly written into the disk unit 300'. When all the data to be transmitted have been written into the disk unit 300', the data are transmitted by the communication control unit (CCU) 700 in the order of the addressee A first and then the addressee B.

Next will be described the details of the facsimile system illustrated in FIG. 1, together with the execution of transmission to addresee A, with concurrent reference to FIGS. 2 to 5.

At first the facsimile system, before the scanning of the document 1, undergoes the entry from the keyboard 10 of addressee information, comprising the telephone number of the receiving side (the addressee A), and of recording confirmation reply demand information to the addresee A. In this case, a designated code indicating the addressee may be added to the addressee information. The output of the keyboard 10 is supplied to the operation control unit 100.

Figure 2:
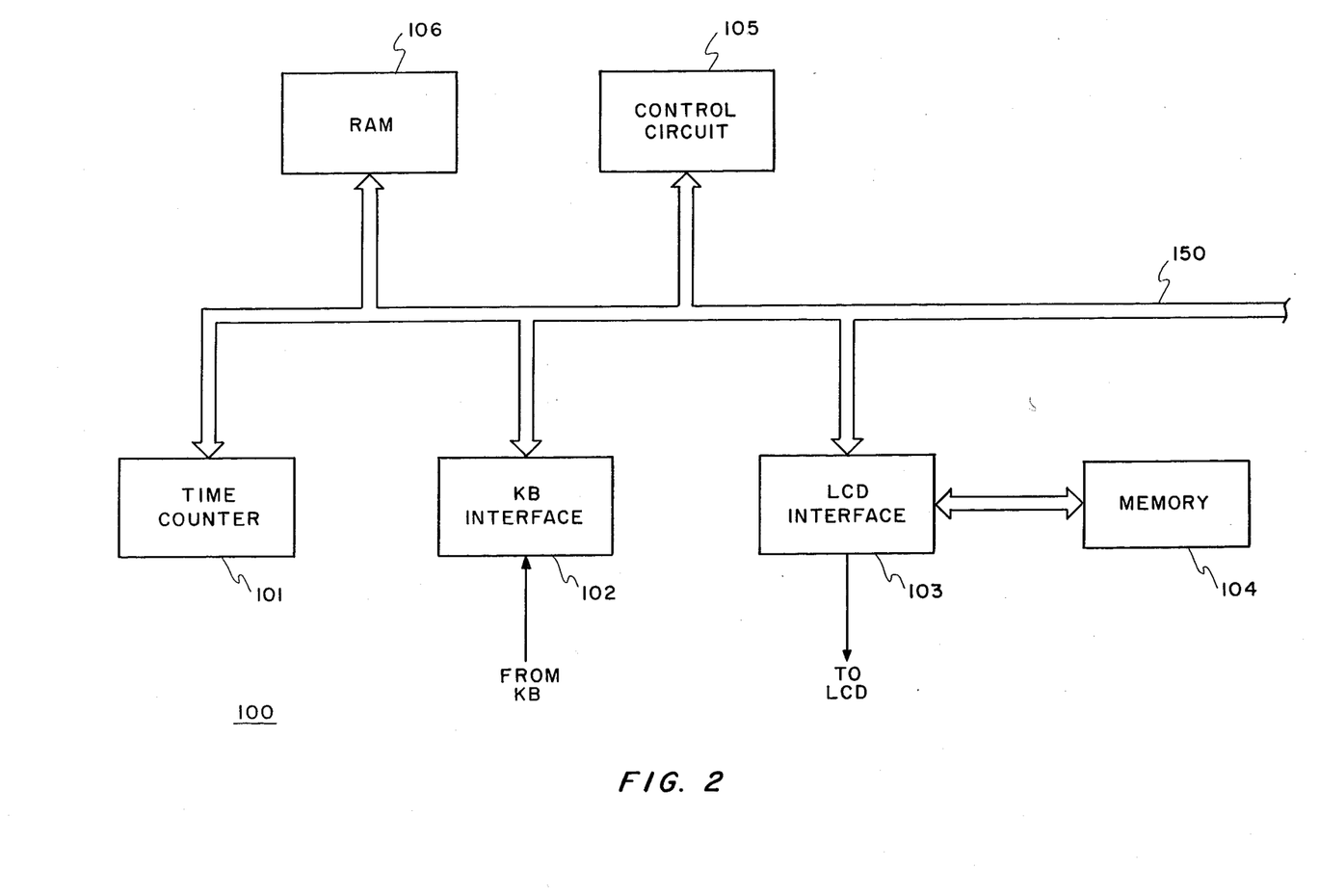
FIG. 2 is a block diagram of an operation control unit for use in the facsimile system illustrated in FIG. 1.

The operation control unit 100, as shown in FIG. 2, comprise a timer circuit 101 for constantly counting clock pulses and supplying eight-bit count data as required; a keyboard interface 102 for converting key information entered from the keyboard 10 into data transfer information, such as ASCII codes; an LCD interface 103 for reading out, in accordance with information supplied from the keyboard interface 102 to the bus 150, character data (dot matrix data) stored in a memory 104, and having them displayed on the LCD display 20; and a control circuit 105 for controlling the whole operation control circuit through the bus 150.

When addressee information and recording confirmation reply demand information are entered from the keyboard 10, the keyboard interface 102 supplies them to the bus 150 in ASCII code-specified data and designated codes. As the data are fed from the control circuit 105 to the LCD interface 103, the LCD 20 displays in characters in a dot matrix the information entered from the keyboard 10. The control circuit 105 also causes the output of the keyboard interface 102 to be stored in a random access memory (RAM) 106, prepares overhead information on the basis of the addressee information and recording confirmation reply demand information, and generates a read instruction, which, together with the overhead information, is fed to a control circuit 201A of the system intelligence controller 200A, shown in FIG. 3, via the bus 150. The bus 150 consists of an eight-bit data bus, a 20-bit address bus and a control bus.

Figure 3:
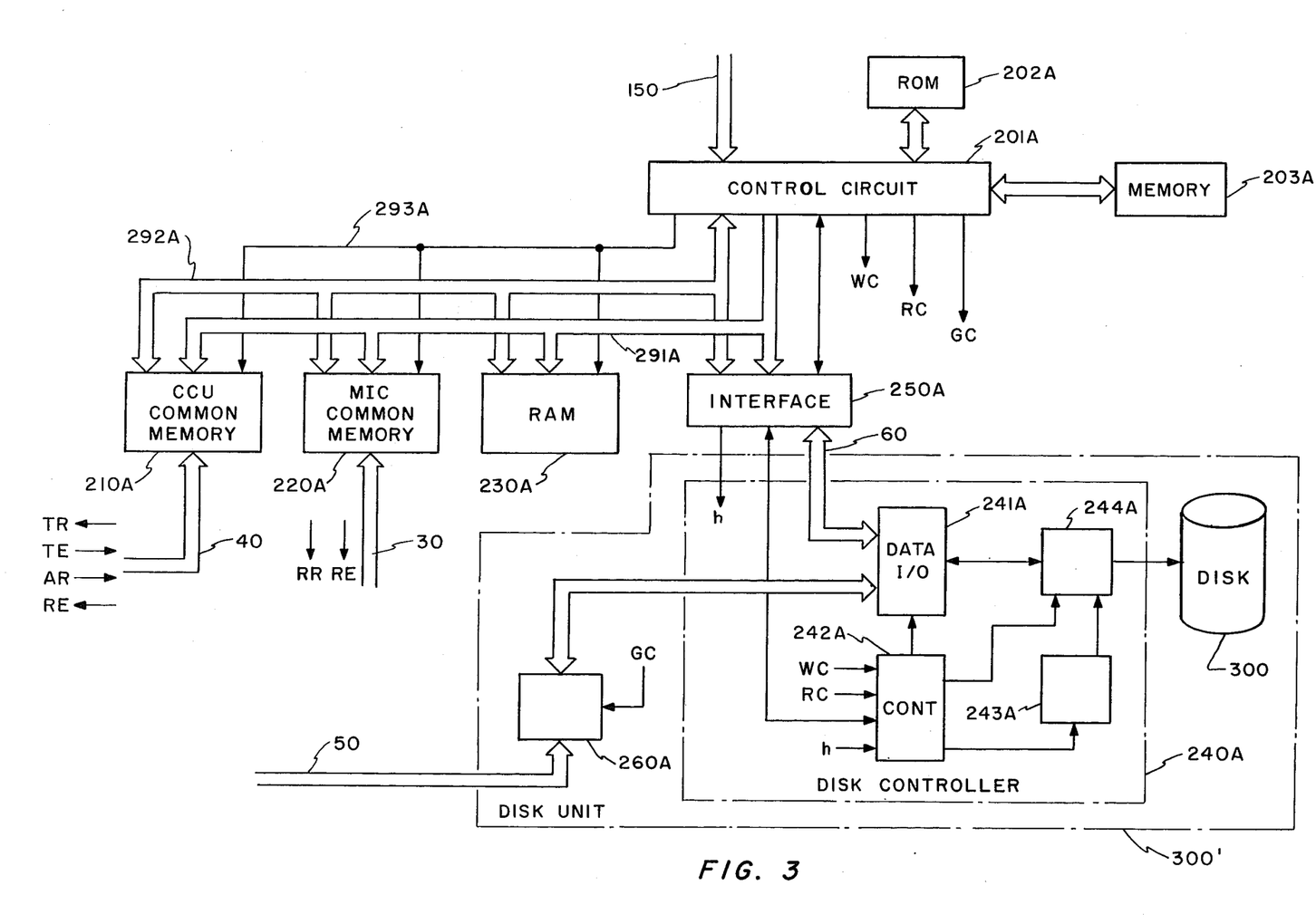
FIG. 3 is a block diagram of a system intelligence controller for use in the facsimile system illustrated in FIG. 1.

The system intelligence controller 200A, as illustrated in FIG. 3, is structured around the control circuit 201A, and includes a communication control unit (CCU) common memory 210A for temporarily storing in eight-bit units various information transmitted to or received from a CCU 700; a multiple controller (MIC) common memory 220A for temporarily storing, by way of a bus 30, in eight-bit units control information transmitted to or received from a MIC 200B; a RAM 230A for storing various data other than encoded data; a memory 203A for storing control numbers, each of which designates a storage area in a disk 300 of the disk unit 300' for an addressee; a disk controller 240A for controlling the writing of data into, and their reading out of, the disk 300; an input/output interface 250A; and a ROM 202A storing a control program for the system intelligence controlles 200A.

Various information is written into, and read out of, in a short period of time in a prescribed timing into the CCU common memory 210A and the MIC common memory 220A via the buses 30 and 40, an address bus 291A, a data bus 292A and a control bus 293A. The writing/reading operation is repeated at prescribed intervals. The control circuit 201A accesses the memories 210A and 220A at regular intervals, and monitors the conditions of the communication control unit 700 and the multiple controller 200B. If there is any change in the conditions of the memory 210A or 220A, various control information is generated by interruption in accordance with a control program stored in advance in the ROM 202A.

As a read start instruction is supplied from the operation controller 100 to the control circuit 201A via the bus 150, the control circuit 201A generates read instruction information, which is stored in the MIC common memory 220A, and writes overhead information regarding the addressee A, received from the bus 150, into a prescribed address in the RAM 230A.

Figure 4:
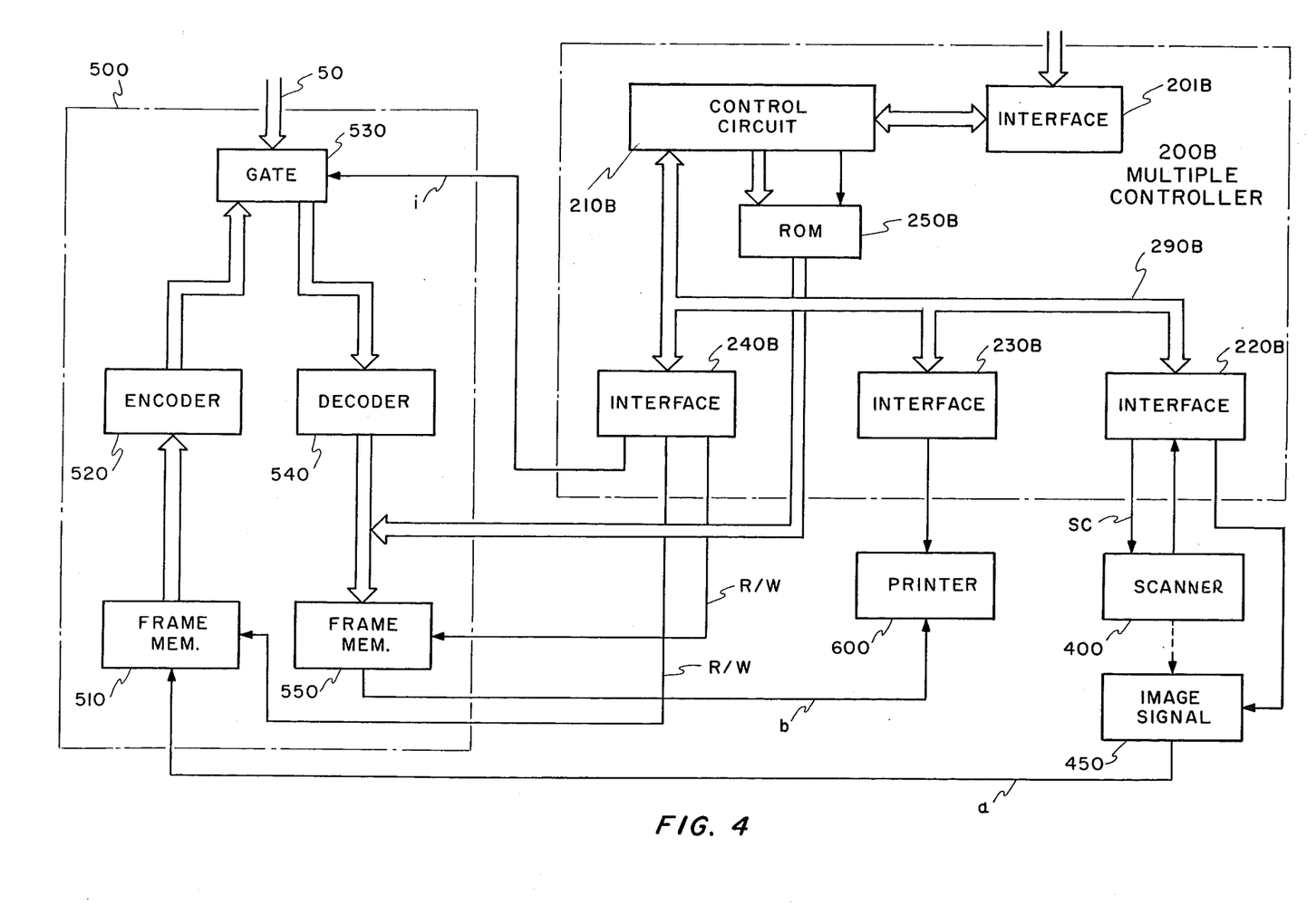
FIG. 4 is a block diagram of a multiple controller for use in the facsimile system illustrated in FIG. 1 and a peripheral unit to be controlled thereby.

The read instruction information written into the MIC common memory 220A is read out in a prescribed timing by way of an interface 201B of the multiple controller 200B, shown in FIG. 4, and transferred to the control circuit 210B, which in response controls the input/output interface 220B through a bus 290B to send a scanning instruction signal SC to the document scanner unit 400. Then, the document scanner unit 400 optically scans line by line the document 1 set therein. The image signal generator circuit 450, in response to reflected light from the document, generates an image signal a and supplies it to the frame memory and CODEC 500. Upon completion of the scanning of the document 1, the fact of completion is made known by the document scanner unit 400 via the input/output interface 220B to the control circuit 210B, which in response instructs preparation for the scanning of the next document.

The frame memory and CODEC 500 includes a frame memory 510 for storing image data; an encoder 520 for encoding the data of the frame memory 510 by, for instance, the two-dimensional coding scheme (the MR coding scheme) specified by the CCITT Recommendation T4; a decoder 540 for decoding the encoded data into the original image data; and a frame memory 550 capable of storing the decoded image data, and each component depends on the I/O interface 240B of the multiple controller 200B for its control.

The frame memory 510 (550) consists of two memory subunits incorporating a serial to parallel converter, each memory with a storage capacity for one page of document. While image data are being written into one of the subunits in response to a read/write (R/W) control signal, the data of the other are read out. The encoder 520 encodes the eight-bit image data to provide the encoded data to a three-state gate 530. The three-state gate 530 allows the encoder 520 to couple to the bus 50 in response to a control signal i during an encoding process while during a decoding process, it allows the bus 50 to couple to the decoder 540. When neither encoding nor decoding is taking place, the gate is kept in a high impedance state.

The encoded data of the document 1 are entered into a data input/output (I/O) circuit 241A of the disk controller 240A by way of a three-state gate 260A (FIG. 3). The three-state gate 260A opens in response to a gate control signal GC from the control circuit 201A, immediately before the gate 530 opens in response to the signal i. The data I/O circuit 241A sequentially outputs the encoded data of the document 1 toward the disk 300 under the control of the control circuit 242A. Its timing is synchronized with a write instruction signal WC supplied from the control circuit 201A. When writing data, the control circuit 201A reads out of the memory 203A a control number corresponding to the addressee A, and the interface 250A generates a physical address signal h in accordance with that control number. The control circuit 242A, in response to the write instruction signal WC and the physical address signal h, so controls the encoded data, supplied by the data I/O circuit 241A, as to be stored in a prescribed memory area. Thus the control circuit 242A sends a head selection signal to a head selector circuit 244A and a positioning signal for determining the head position to a head positioner 243A, thereby to select the proper head and to designate the proper head position. In the memory area of the disk 300 corresponding to the control number of the addressee A is written overhead information concerning the addressee A stored in the RAM 230A (the telephone number of the transmitting party, the control number, the recording confirmation reply demand and the telephone number of the addressee), in addition to the encoded data of the document 1, for every physical address signal h. When data are to be read out of the disk 300, the control circuit 242A reads out data from the prescribed memory area of the disk 300 corresponding to the control number, and supplies the encoded data to the bus 50 via the three-state gate 260A and the overhead information to the I/O interface 250A via the data bus 60.

Upon writing of the encoded data and overhead information of the document 1, to be transmitted to the addressee A, into the disk 300, the control circuit 201A makes the completion of the writing known to the operation controller 100, which causes the LCD 100 do display the completion of the writing into the disk 300. After this displaying, the documents m and n for the addressee B are set in the document scanner unit 400 and, as recording confirmation reply demand information is entered from the keyboard 10, the encoded data of the image information of the documents m and n and the overhead information to be sent to the addressee B are written into a memory area in the disk 300 designated by the control number of the addressee B.

Upon completion of the writing of all the overhead information and encoded data for the addressees A and B into the disk 300, the control circuit 201A reads the telephone number of the addressee A out of a memory area corresponding to the control number of the data first written in, i.e. the control number of the addressee A. This reading, intended for making a call to the addressee A, is done when the vacancy of a line is made known by the CCU 700 to the CCU common memory 210A. The telephone number of the addressee A read out of the disk 300 is supplied via the CCU common memory 210A to the CCU 700 as transmission instruction information TR.

Figure 5:
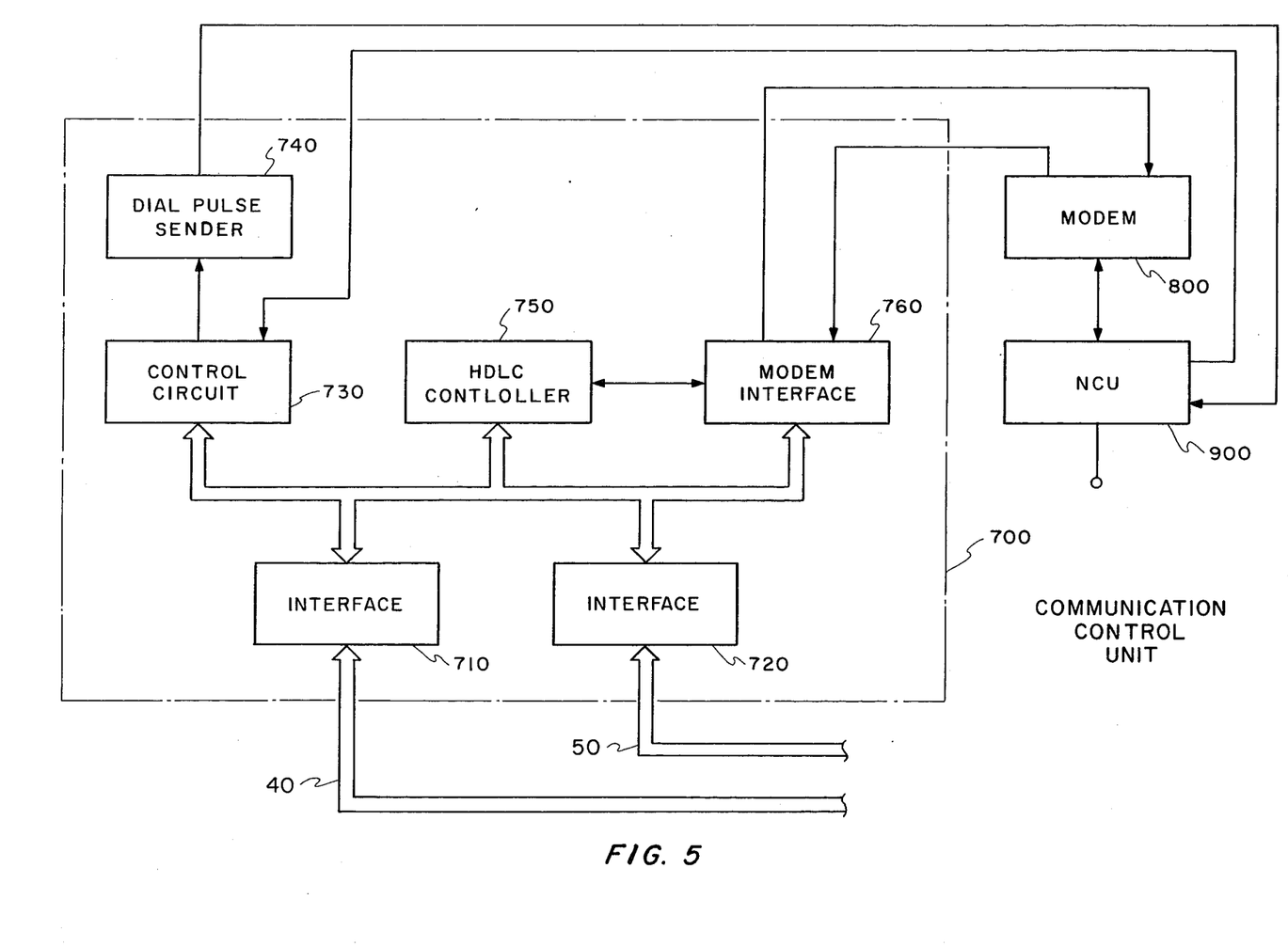
FIG. 5 is a block diagram of a communication control unit for use in the facsimile system illustrated in FIG. 1.

The CCU 700, as illustrated in FIG. 5, has an interface 710 for controlling via the bus 40 the writing and reading of data into or out of the CCU common memory 210A; another interface 720 for transmitting and receiving encoded data via the bus 50; a CCU control circuit 730; a dial pulse sender 740; an HDLC controller 750 for transmitting the overhead information and encoded data, respectively received by the interfaces 710 and 720, in accordance with the protocol of packet communication prescribed in the CCITT Recommendation X 25; and a MODEM interface 760. When transmission instruction information TR is read out of the CCU common memory 210A, the CCU control circuit 730, in response to the telephone number of the addressee A in the information TR, actuates the dial pulse sender 740 to send a dial pulse to the NCU 900, and makes a call to the addressee A. When the connection of the line to the addressee A is detected by the NCU 900 and preparations for data sending to the addressee A are completed, the CCU control circuit 730 writes from the interface 710 into the CCU common memory 210A notice TE of the completion of sending preparations. When the addressee A is called and found engaged, the calling operation is repeated at prescribed intervals until line connection is made or for a prescribed number of times. If connection still fails to be made after a prescribed number of repeated calls, the failure to connect is written into the CCU common memory 210A. Therefore, when the addressee A is called, either a notice TE of the completion of sending preparations or a notice of failure to connect is written into the CCU common memory 210A of the system intelligence controller 200A.

If a notice of failure to connect is written into the CCU common memory 210A, when the control circuit 201A reads it out, an instruction to display the failure to connect will be sent to the control circuit 105 of the operation control unit 100 (FIG. 2), and in response the LCD 20 will display the failure of connection the the addressee A.

Meanwhile, as a notice TE of the completion of sending preparations is written into the CCU common memory 210A and the control circuit 201A reads it out, a read instruction signal RC is generated, and the disk controller 240A reads out overhead information concerning the addressee A out of the memory area corresponding to the control number of the addressee A. The overhead information read out is written from the data I/O circuit 241A into the CCU common memory 210A via the input/output interface 250A, and read out by the interface 710 of the CCU 700 in a prescribed timing. The CCU control circuit 730 then supplies the overhead information to the HDLC controller 750. The HDLC controller 750 prepares frames, comprising flags, address, control, data, frame check sequence bits, each having as its data packet an overhead information, i.e. the telephone number of the transmitting party, the control number, the telephone number of the addressee, or the presence or absence of a recording confirmation reply demand, in accordance with the CCITT Recommendation X-25, and supplies them to the MODEM 800 via the MODEM interface 760. The MODEM 800 modulates the frames containing the overhead information, and sends them out to the line via the NCU 900. As reply information responding to the reception of the overhead information is sent out from the addressee A, the CCU control circuit 730 writes a notice of that reply from the interface 710 into the CCU common memory 210A shown in FIG. 3. The control circuit 201A, upon reading the notice of reply from the CCU common memory 201A, first generates a gate control signal GC to open the gate 260A. Then it generates a read instruction signal RC, so controls the disk controller 240A as to read the encoded data of the document 1 out of the memory area corresponding to the control number of the addressee A, and sequentially sends them in eight-bit units from the data I/O circuit 241A to the bus 50. The HDLC controller 750 of the CCU 700 prepares a frame whose data packet consists of the encoded data of the document 1 in conformity with the CCITT Recommendation X 25, as mentioned when sending out the overhead information, and sends them out to the MODEM 800 via the MODEM interface 760. The MODEM 800 modulates frame signals supplied from the MODEM interface 760, and sends them out to the line via the NCU 900 at a prescribed transmission speed. Upon confirming the disengagement of the line by the addressee A on the receiving side after sending out all the information addressed to the addressee A, the NCU 700 disengages the line. After that, the facsimile system initiates a call to the addressee B, reads out overhead information and the encoded data of the documents m and n stored in the disk 300 according to the control number of the addressee B, and transmits them to the addressee B.

Next will be described the facsimile receiving operation at the addressee A, whose facsimile system is supposed to be exactly the same as that illustrated in FIG. 1, with reference to FIGS. 1 to 5.

As the NCU 900 connects the line in response to a call by the transmitting party and receives transmitted data having overhead information, the MODEM 800 demodulates them to provide and a frame, conforming to the CCITT Recommendation X 25, for the MODEM interface 760 (FIG. 5) of the CCU 700. The HDLC controller 750 separates the frame, extracts the overhead information contained in the data packet segment of the frame and, the control of the CCU control circuit 730 writes the information from the interface 710 into the CCU common memory 210A of the system intelligence controller 200A, shown in FIG. 3, in a prescribed timing. Into the CCU common memory 210A, before the overhead information is received from the transmitting party, is written reception acceptance information AR from the CCU 700, and the facsimile system is made ready for reception. In this state, the overhead information written into the CCU common memory 210A is written into the disk 300 via the I/O interface 250A and the disk controller 240A. The position of this write-in is designated by the control number in the overhead information. Thus, when the control circuit 242A is instructed to write by a write instruction signal WC, the overhead information from the data I/O circuit 241A is stored, in response to a physical address signal h, in a memory area region designated by the control number. When the overhead information is written into the disk 300, the CCU 700 demands via the MODEM 800 reception of data to be transmitted. As, in compliance with this demand, the transmitting party transmits as packets the encoded data of the document 1 and the receiving party receives and demodulates to provide the encoded data which are taken out by the HDLC controller 750 from the frame conforming to the CCITT Recommendation X 25, and sequentially sent out from the interface 720 to the bus 50. The encoded data sent to the bus 50 are written into a prescribed memory area of the disk 300 designated by the control number of the addressee A under the write position control of the control circuit 242A.

Then, the control circuit 201A of the system intelligence controller 200A reads out the contents of the MIC common memory 220A, and judges whether or not the printer 600 is in use. If the printer is not in use, the control circuit 201A writes the recording instruction information RR and information on the number of pages to be recorded into the MIC common memory 220A. Meanwhile, as recording instruction information RR is written, the control circuit 201A writes information to instruct disengagement of the line into the CCU common memory 210A, and this information is read out by the CCU 700 to instruct disengagement of the line to the NCU 900.

Referring now to FIG. 4, the control circuit 210B reads out via the interface 201B recording instruction information RR stored in the MIC common memory 220A, and sends it to the printer 600 through the I/O interface 230B. Meanwhile, the disk controller 240A (FIG. 3) reads the encoded data of the document 1 out of the disk 300, and supplies them to the bus 50. The encoded data fed to the bus 50 are entered via the three-state gate 530 into the decoder 540 which decodes them to generate original binary image data of the black and white level. The image data are written into the frame memory 550, with each bit corresponding to one picture element. When one-page equivalent of the document 1 has been written in, the data is read out to produce a serial image signal b for transfer to the printer 600. Since the printer is instructed by the recording instruction information RR through the interface 230B to execute recording, it reproduces a video image of the document 1. Meanwhile, as the completion of reading out by the frame memory 550 is confirmed by the interface 240B, the control circuit 210B perceives the completion of writing of one page of the document and, upon perception of the absence of any other instruction than that to record the page of the document (document 1), completes recording at this point of time, then sending recording completion information to the MIC common memory 220A.

With reference to FIG. 3, in response to the recording confirmation reply demand information taken out of the overhead information, the control circuit 201A will read out of the time counter circuit 101 of the operation controller 100 the time (day, hours and minutes) of the completion of recording of the image information, and stores it in the memory area of the disk 300 corresponding to the control number of the addressee A. The control circuit 201A writes transmitting instruction information TR including the telephone number of the transmitting party into the CCU common memory.

If the line is not engaged at this time, the CCU control circuit 730 (FIG. 5) will control the dial pulse sender 740, sends a dial pulse to the NCU 900 according to the transmitting party's telephone number read out of the CCU common memory 210A, and thereby calls the transmitting party. If the transmitting party is engaged, the calling operation will be repeated at prescribed intervals until connection is made or for a prescribed number of times. If connection still fails to be made after a prescribed number of repeated calls, the failure to connect will be indicated and an alarm given to the operator. Incidentally, an arrangement is made to keep the line disengaged while waiting for the disengagement of the other party, so that a call from another station can be responded to.

After the line has been connected, as preparations are made for sending to the transmitting party recording confirmation reply information RE, the CCU control circuit 730 writes a notice TE of the completion of sending preparations into the CCU common memory 210A. The CCU common memory 210A, generates a read instruction signal RC according to the notice TE of the completion of sending preparations, and the disk controller 240A reads overhead information for the addressee A, i.e. the completion time of recording, telephone number of the receiving party, that of the transmitting party and control number, out of the memory area of the disk 300 corresponding to the control number, and writes them into the RAM 230A via the I/O interface 250A. At this time, the above-mentioned data written into the RAM 230A are written item by item as character information in the ASCII code. The control circuit 201A reads these data out of the RAM 230A, and writes them into the CCU common memory 210A as recording confirmation reply information RE. The CCU 700 reads out the recording confirmation reply information RE via the bus 40, prepares a packet of data to be transmitted according to the protocol conforming to the CCITT Recommendation X 25, and sends them to the MODEM 800, which in turn sends them to the line after modulating them as prescribed. When the transmission instruction information TR from the CCU control common memory 210A is extinguished and the sending of data from the MODEM 800 has been completed, the CCU 700 restores the line, and completes the series of receiving operation.

Next will be described the operation by the transmitting party to confirm the completion of recording by the receiving party (addressee A) with reference to FIGS. 1 to 5.

Before the receiving party (addressee A) sends the recording confirmation reply information RE, a notice AR of reception acceptance, indicating the readiness of the MODEM 800 to receive signals, is written from the CCU 700 into the CCU common memory 210A, to set the system in the receiving mode. As the recording confirmation reply information RE is received from the MODEM 800 in this mode, the information is sequentially transferred to the CCU common memory 210A. The control circuit 201A of the system intelligence controller 200A immediately reads out the recording confirmation reply information RE written into the memory 210A, stores it in the RAM 230A and, at the same time, causes the NCU 900 to disengage the line. The control circuit 201A also supplies a write instruction signal WC to the disk controller 240A, and writes the recording confirmation reply information RE, stored in the RAM 230A, into a prescribed memory area in the disk 300 designated by the control number of the addressee A via the I/O interface 250A and the data I/O circuit 241A. The control circuit 201A judges whether or not the printer 600 is ready to start recording according to whether or not recording instruction information RR is written in the MIC common memory 220A. If the printer is ready, the control circuit 201A will supply a recording instruction signal RC to the disk controller 240A, which reads out the recording confirmation reply information RE out of the disk 300. Meanwhile, if the printer 600 is in use, the control circuit 201A will wait until the printer 600 is made ready for recording. The recording confirmation reply information RE, which is read out, is sent to the ROM 250B on a character-by-character basis by the control circuit 210B of the multiple controller 200B (FIG. 3). The control circuit 210B, according to ASCII-coded information representing the recording confirmation reply information RE, retrieves from the ROM 250B character pattern data in a dot form corresponding to the telephone number of the transmitting party, that of the receiving party, control number and data and time of reception at receiving side, and sequentially reads out the dotted character pattern data, beginning with the first line, in the order of retrieval to provide them for the frame memory 550, which converts to and supplies the serial data to the printer.

If it is desired to confirm the number of document pages received, the addressee can add a datum on the number of document pages recorded to the recording confirmation reply information.

As hitherto described, the facsimile system according to the present invention makes it possible for the transmitting party to confirm the completion of recording by the receiving party even if there is a time lag between the reading of the document and its transmission or between its reception and recording, because it stores in memory means, at the time of transmitting the document, encoded signals and overhead information including recording confirmation reply demand information and transmits them upon connection of the line, and at the receiving end the received signals are stored in its memory means and recorded upon disengagement of the recording unit, the transmitting party preparing and recording character information according to recording confirmation reply information sent from the receiving party in response to recording confirmation reply demand information upon completion of its recording process. Therefore, the invention has the advantages of increasing the certainty of facsimile communication and reducing the duration of the engagement of the line per call, thereby to substantially improve the operating efficiency of the line.

What is claimed is:

1. A facsimile system comprising:
   operation controller means for generating overhead information including an addressee and a demand for a recording confirmation response and for instructing the transmission of a document;
   scanner means for scanning the document and producing binarized picture data;
   CODEC means for encoding said picture data and for decoding received picture data;
   storage memory means for memorizing said overhead information and encoded data;
   printer means for printing out the decorded picture data;
   communication controller means for calling a designated receiving party upon disengagement of a line, transmitting various information stored in said storage memory means after the connection of the line, and receiving recording confirmation response information which the receiving party transmits after completion of the reproduction of the document in response to recording confirmation response demand information sent from the transmitting party;
   a main controller means for accomplishing scanning control of said scanner means, write-in and readout control of said storage memory, communication control of said communication controller means, and printing control of said printer means; and
   control means responsive to said recording confirmation response information for instructing said printer to print out characters indicating the completion of the reproduction of the document at the receiving party.

2. A facsimile system, as claimed in claim 1, wherein said storage memory means for encoded information is a magnetic disk memory.

3. A facsimile system comprising a transmitting facsimile machine having a large scale memory means for storing picture data, overhead data including at least one called party address and a signal demanding confirmation of reception; means responsive to encountering busy called line conditions for repeatedly attempting to transmit said stored data to a distant facsimile machine identified by said called party address; means responsive to a completion of said transmission to said distant facsimile machine of said data readout of said memory means for demanding confirmation from the receiving facsimile machine that the data has been received, and means responsive to said demand for returning said confirmation signal.

4. The system of claim 3 wherein said receiving facsimile machine has printer means for generating a graphic representation of said picture data responsive to the receipt of said transmitted data, and means responsive to said printer means completing said graphic representation for sending said confirmation signal.

5. The system of claim 4 wherein there is a printer means associated with said transmitting facsimile machine, and means responsive to receipt of the confirmation signal for indicating a completion of reproduction signal at said transmitting machine.

6. The system of claim 4 and operation control means at said transmitting facsimile machine for generating said overhead data by assembling the transmitting machine telephone number, the receiving machine telephone number, and a demand for confirmation signal.

7. The system of claim 3 and means responsive to a continuing failure to complete transmission of said data after a predetermined number of said repeated attempts for giving a failure to transmit alarm.

8. The system of claim 3 and means for keeping the line to said transmitting facsimile machine in an idle and disengaged condition either until said repeated attempts succeed in transmitting said data to distant machine or until after a predetermined number of said repeated attempts have been made, whichever occurs first.

9. The system of claim 8 and means for giving an alarm if said predetermined number of said attempts occur before said successful transmission of said data.

10. A facsimile system comprising memory means, means for storing encoded signals and overhead information in said memory means at the time of transmitting a document, said overhead information including a demand for a confirmation of recording information, means for transmitting said encoded signals and said overhead information upon a completion of a connection to a receiving facsimile machine, memory means at the receiving end of said connection for storing the received signals and the overhead information, means responsive to a printout and disengagement of a recording unit at the receiving facsimile machine for sending to the sending machine information indicating a confirmation of recording in response to the demand for a confirmation of recording information, whereby a transmitting party may confirm the completion of recording by the receiving party even if there is a time lag between reading out and transmitting a document at a sending machine or between reception and recording a document at a receiving machine.

* * * * *